(12) United States Patent
Sogawa

(10) Patent No.: US 7,139,424 B2
(45) Date of Patent: Nov. 21, 2006

(54) STEREOSCOPIC IMAGE CHARACTERISTICS EXAMINATION SYSTEM

(75) Inventor: Yoshiyuki Sogawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 702 days.

(21) Appl. No.: 10/379,192

(22) Filed: Mar. 4, 2003

(65) Prior Publication Data

US 2003/0169918 A1 Sep. 11, 2003

(30) Foreign Application Priority Data

Mar. 6, 2002 (JP) .............................. 2002-060841

(51) Int. Cl.
*G06K 9/00* (2006.01)
*H04N 13/00* (2006.01)

(52) U.S. Cl. ......................................... 382/154; 348/43

(58) Field of Classification Search ................ 382/151, 382/154, 209, 218, 278, 291, 294; 345/419; 348/43, 47, 218.1
See application file for complete search history.

(56) References Cited

U.S. PATENT DOCUMENTS

| 5,142,642 A | * | 8/1992 | Sudo | 348/47 |
| 5,668,595 A | * | 9/1997 | Katayama et al. | 348/218.1 |
| 5,699,444 A | * | 12/1997 | Palm | 382/106 |
| 5,748,199 A | * | 5/1998 | Palm | 345/473 |
| 5,860,912 A | * | 1/1999 | Chiba | 600/111 |
| 6,137,902 A | * | 10/2000 | Kinoshita et al. | 382/154 |
| 7,006,707 B1 | * | 2/2006 | Peterson | 382/285 |

FOREIGN PATENT DOCUMENTS

| EP | 0 957 642 A2 | 11/1999 |
| EP | 1 087 205 A2 | 3/2001 |
| JP | 11-325889 | 11/1999 |
| JP | 2001-091245 | 4/2001 |
| JP | 2001-092968 | 4/2001 |

\* cited by examiner

*Primary Examiner*—Daniel Miriam
(74) *Attorney, Agent, or Firm*—Darby & Darby

(57) ABSTRACT

A stereo camera and an examination screen having a pattern based on grid lines are arranged at prescribed positions relative to each other. The stereo camera photographs the examination screen to obtain two original images. A stereoscopic image characteristics detection unit obtains the coordinates of each grid point on each image. A correction data generation unit generates correction data for correcting a variation in the image characteristics on the basis of the obtained coordinates and the corresponding ideal coordinates stored previously of each grid point. A correction data writing unit writes the generated correction data into a stereoscopic image recognition unit. Thus, prior to shipment of the stereo camera and the stereoscopic image recognition unit or upon readjustment after shipment, the characteristics of an stereoscopic image are examined to obtain high-accurate correction data. The high-level capability of the stereo camera is maintained using the correction data.

8 Claims, 8 Drawing Sheets

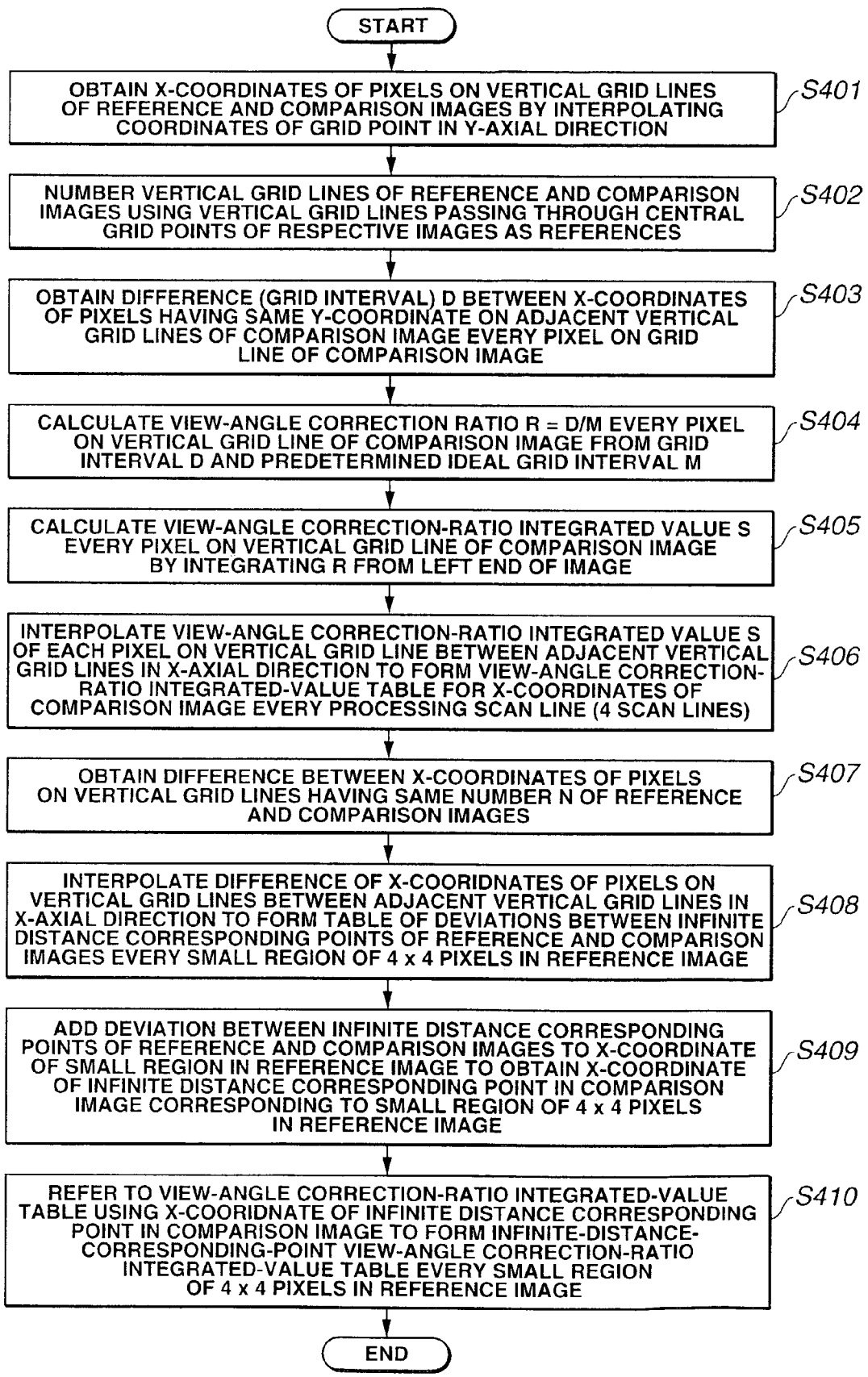

STEREOSCOPIC IMAGE CHARACTERISTICS EXAMINATION SYSTEM

The disclosure of Japanese Patent Application No. 2002-60841 filed on Mar. 6, 2002 including the specification, drawings and abstract is incorporated herein by reference in its entirety.

BACKGROUND OF THE INVENTION

1. Field of the Invention

The present invention relates to a stereoscopic image characteristics examination system for examining the characteristics of a stereoscopic image photographed by a stereo camera to generate correction data.

2. Description of the Related Art

Hitherto, a stereoscopic image recognition technique using a plurality of cameras is known as a technique of three-dimensionally recognizing a space. The stereoscopic image recognition technique is applied to, for example, an obstacle detecting apparatus which is mounted on a vehicle such as an automobile. According to this technique, while the distance between the automobile and a solid object being detected, an obstacle which lies ahead and the shape of a road are recognized, thus contributing to the improvement of safety.

Generally, apparatuses using the stereoscopic image recognition technique use a method for searching for a matching point on images captured by cameras constituting a stereo camera to obtain a parallax therebetween and then calculating distance information from the parallax. In order to maintain the recognition capability of the apparatus, it is necessary to ensure the reliability of matching point search and parallax detection accuracy.

Accordingly, in Japanese Unexamined Patent Application Publication No. 11-325889, the present applicant has proposed a technique of correcting a nonlinear positional deviation between images captured by a stereo camera to align the optical axes of the images, resulting in uniform base line for matching search. In Japanese Unexamined Patent Application Publication No. 2001-91245, the present applicant has proposed a technique of correcting a parallax detection error caused by the characteristics and variations of optical systems such as lenses. Furthermore, in Japanese Unexamined Patent Application Publication No. 2001-92968, the present applicant has proposed a technique of correcting a matching-search start position so that an appropriate search range can be set depending on a position on an image.

However, maintaining the capability of the stereoscopic image recognition apparatus requires a system which can obtain comprehensive and high-accurate correction data for the characteristics of stereoscopic images for each apparatus prior to shipment of the apparatus or upon readjustment after the shipment. Furthermore, it is preferable that correction data be obtained in a system, which is constructed as simple as possible, to eliminate a factor causing an increase of the cost of the apparatus.

SUMMARY OF THE INVENTION

It is an object of the present invention to provide a stereoscopic image characteristics examination system capable of comprehensively examining the characteristics of a stereoscopic image in a simple system construction with high accuracy to obtain high-accurate correction data for correcting a variation in the image characteristics.

According to the stereoscopic image characteristics examination system of the present invention, an examination screen having a grid pattern is arranged in the shooting direction of a stereo camera including a plurality of cameras. The coordinates of each grid point of each of images of a stereoscopic image obtained by photographing the examination screen are obtained in correspondence to each of the cameras constituting the stereo camera. On the basis of the obtained coordinates and the previously stored ideal coordinates of each grid point, correction data for correcting a variation in the stereoscopic image characteristics is generated, the variation being caused by at least the characteristics of the stereo camera.

Furthermore, the system obtains images constituting the stereoscopic image of an examination screen having a grid pattern provided in the shooting direction of a stereo camera. The coordinates of each grid point of images are obtained in correspondence to each of the cameras constituting the stereo camera. On the basis of the obtained coordinates and the previously stored ideal coordinates of each grid point, correction data for correcting a variation in the stereoscopic image characteristics is generated, the variation being caused by at least the characteristics of the stereo camera.

Further features and advantages of the present invention will become apparent from the following description.

BRIEF DESCRIPTION OF THE DRAWINGS

FIG. 11 is a flowchart of a process of calculating view-angle correction data.

DESCRIPTION OF THE PREFERRED EMBODIMENT

Figure 1:
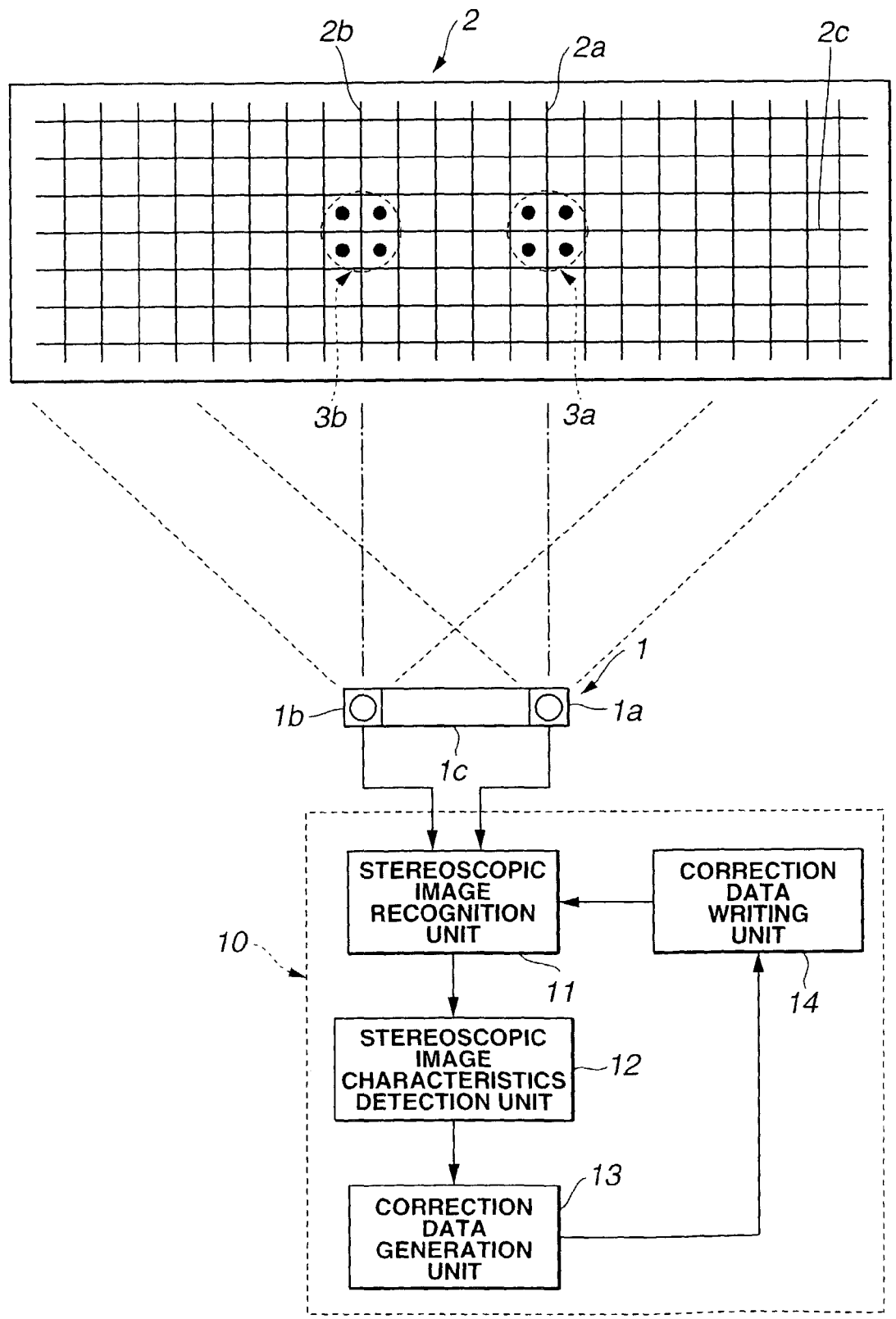
FIG. 1 is a diagram showing the configuration of a stereoscopic image characteristics examination system according to the present invention.

FIG. 1 shows a stereoscopic image characteristics examination system for examining the characteristics of a stereoscopic image to obtain correction data. The stereoscopic image characteristics examination system comprises a stereo camera 1 comprising a plurality of cameras (according to the present embodiment, two cameras), serving as examination subjects, an examination screen 2 serving as a subject to be photographed, the screen being used to examine the characteristics of images captured by the stereo camera 1, and an image processing unit 10 connected to the stereo camera 1.

The stereo camera 1 comprises a reference camera 1a and a comparison camera 1b which are synchronized with each other, each of which includes an imaging device such as a charge coupled device (CCD), and whose shutter speed is variable. The reference camera 1a takes a picture serving as a reference image used for stereo processing. The comparison camera 1b takes a picture serving as a comparison image used for stereo processing. The reference camera 1a and the comparison camera 1b are fixed to a stay 1c with a predetermined base line length therebetween so that the optical axes are substantially parallel to each other.

The image processing unit 10 comprises: a stereoscopic image recognition unit 11 for performing a stereo matching process of searching for a matching portion every predetermined small region (for example, a small region of 4×4 pixels) of a pair of images (stereoscopic image) captured by the stereo camera 1 to obtain a parallax, and then performing various recognizing processes on the basis of three-dimensional distance distribution information based on the obtained parallax; a stereoscopic image characteristics detection unit 12 for detecting the characteristics of the stereoscopic image, the unit 12 being connected to the stereoscopic image recognition unit 11; a correction data generation unit 13 for generating correction data on the basis of the stereoscopic image characteristics; and a correction data writing unit 14 for writing the generated correction data into the stereoscopic image recognition unit 11. In the image processing unit 10, the stereoscopic image recognition unit 11 can be integrated with the units 12, 13, and 14 or can be arranged separately therefrom. The stereo camera 1 serving as an examination subject is combined with the stereoscopic image recognition unit 11 in a one-to-one relationship. Thus, the combined camera 1 and unit 11 are handled as an examination set.

In other words, the two cameras 1a and 1b constituting the stereo camera 1 are mechanically adjusted in an initial manufacturing step so as to have a predetermined relative positional relationship therebetween, for example, so that the optical axes are parallel to each other, and are then fixed to the stay 1c. However, for the images captured by the cameras 1a and 1b, there are not a little linear and nonlinear positional deviations between output images because of a deviation between the optical axes caused by limitations in the accuracy of mechanical assembly, the influence of variations in the focal lengths of lenses or distortions of the lenses, a difference in enlargement and reduction ratios in captured images by tilt of the photodetecting surfaces of imaging devices, and variations in sensitivities of the imaging devices and characteristics of signal processing circuits.

In the stereoscopic image recognition unit 11 for processing a stereoscopic image, due to variations in the gains or offsets of amplifiers in signal processing systems corresponding to the two cameras 1a and 1b and variations in the characteristics of circuit elements such as A/D converters, a variation in signal characteristics may exist within an adjustable range. Consequently, linear and nonlinear positional deviations exist between a pair of original images to be subjected to stereo processing.

Accordingly, prior to shipment or upon readjustment after the shipment, on the basis of images obtained by photographing the examination screen 2 with the stereo camera 1, the stereo camera 1 and the stereoscopic image recognition unit 11 are each examined with respect to the distortion characteristics and focal length characteristics of optical lenses, the horizontal and vertical displacement characteristics of the camera optical axes, the rotating-direction characteristics of the cameras, the actual view angle distribution characteristics of the cameras, infinite-distance parallax distribution characteristics, and equidistant-surface distribution characteristics obtained by photographing subjects arranged at the same distance. Then, correction data is generated on the basis of the examination results. The correction data is stored in a non-volatile memory in the stereoscopic image recognition unit 11 combined with the stereo camera 1 in a one-to-one relationship. Thus, correct distance distribution information can be certainly obtained in the actual operating state in the market.

If a circuit variation in the stereoscopic image recognition unit 11 is negligible, the stereo camera 1 alone can be set as an examination subject and the present examination system may exclude the stereoscopic image recognition unit 11. After the characteristics of the stereo camera 1 are examined, correction data is stored in the stereoscopic image recognition unit 11. After that, the stereo camera 1 can be combined with the stereoscopic image recognition unit 11 in a one-to-one relationship.

Specifically, on the examination screen 2, a pattern based on grid lines at prescribed intervals (for example, each interval that is a fraction of the base line length of the stereo camera 1) is drawn. The stereo camera 1 and the examination screen 2 are correctly arranged at prescribed positions relative to each other so that the stereo camera 1 faces the examination screen in the shooting direction. The stereoscopic image characteristics detection unit 12 obtains the coordinates of each grid point (intersection of the grid lines) on each of two original images obtained by photographing the examination screen 2 with the stereo camera 1. The correction data generation unit 13 generates correction data for correcting a variation in the image characteristics on the basis of the obtained coordinates of each grid point and the previously stored ideal coordinates of each grid point.

The correction data includes coordinate-transformation correlation data for geometrically correcting the coordinates of each grid point on each image, parallax correction data for distance correction based on the view-angle correction ratio (the ratio of the actual view angle to the view angle in an ideal state), and matching-point search-range correction data for correcting a matching-point-search start position in consideration of a deviation between infinite distance corresponding points. As fundamental data, coordinate-transformation correction data for each grid point is generated from a difference between the coordinates of each grid point on each image and the stored ideal coordinates. For the coordinate-transformation correction data for each pixel, the coordinates of respective grid points are interpolated to obtain the coordinate-transformation correction data for each pixel so that all pixels have respective correction data. The view-angle correction ratio is obtained from the ratio of the grid interval on the obtained image to the ideal grid interval stored previously. The view-angle correction ratio is integrated every pixel from the end of the image to obtain parallax correction data and matching-point search-range correction data based on the view-angle correction ratio.

Specifically, on the examination screen 2, reference marks 3a and 3b are drawn at grid positions at substantially the same distance from each other as that between the two cameras 1a and 1b of the stereo camera 1. Namely, the reference mark 3a is drawn in grid segments surrounding the intersection (central grid point on the reference image) of a central vertical grid line 2a for the reference camera 1a and a central horizontal line 2c and the reference mark 3b is drawn in grid segments surrounding the intersection (central grid point on the comparison image) of a central vertical grid line 2b for the comparison camera 1b and the central horizontal line 2c. The reference marks 3a and 3b respectively corresponding to the cameras 1a and 1b are set so as to have a shape that does not affect matching search for each grid point. The relationship between the cameras 1a and 1b is known and the respective start positions for matching search can be clearly set. According to the present embodiment, the reference marks 3a and 3b have the same shape.

Figure 2:
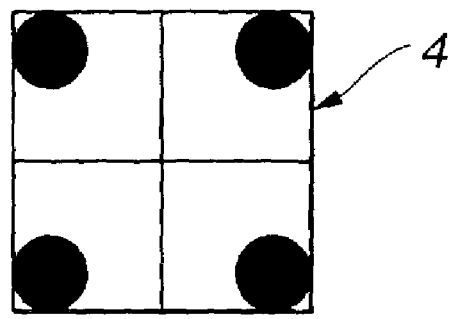
FIG. 2 is an explanatory diagram showing a reference mark pattern.
Figure 3:
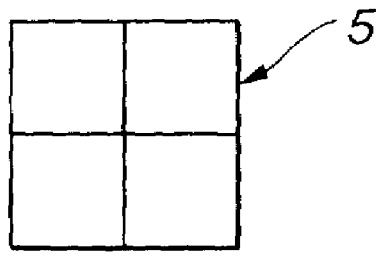
FIG. 3 is an explanatory diagram showing a cross pattern.

Serving as a reference pattern for the reference marks 3a and 3b on the examination screen 2, a reference mark pattern 4 shown in FIG. 2 is previously stored in the stereoscopic image characteristics detection unit 12. Serving as a reference pattern for each grid point, a cross pattern 5 shown in FIG. 3 is also previously stored in the stereoscopic image characteristics detection unit 12. When the coordinates of each grid point on each image is obtained, two-dimensional matching search is performed in the horizontal and vertical directions while an image correlation value is being calculated using the reference mark pattern 4 and the cross pattern 5.

In other words, in order to obtain the coordinates of each grid point on each image, search for matching between the reference mark pattern 4 and each of the reference marks 3a and 3b on the images of the cameras 1a and 1b is first performed. On the basis of the coordinates of each grid point obtained by the matching search result using the reference mark, the coordinates of adjacent grid points are sequentially detected by searching for matching with the cross pattern 5. At that time, the present search area is set to a preset relative position based on the coordinates of the grid point detected at the preceding time, thus preventing a grid point at an incorrect position from being detected.

Preferably, the coordinates of each grid point on each image is obtained at a resolution equivalent to one pixel or less in consideration of image correlation values of coordinates close to the coordinates at which the image correlation value indicates the most matching. According to the present embodiment, a city block distance defined as the sum of absolute values of differences of values of coordinates between two-dimensional planes is used as an image correlation value. The city block distance is calculated using the total sum of absolute values of differences of brightness (luminance) between pixels of two images.

In this case, preferably, the grid line of the examination screen 2 has a gradation in which the lightness varies gradually or continuously from the center of the grid line to the background. The reason is as follows. Generally, in an imaging device such as a CCD which is used in the stereo camera 1, photodetection cells (pixels) are arranged laterally and longitudinally and dead zones always exist between the pixels. Accordingly, in the case of performing a sub-pixel process of detecting coordinate information at a resolution equivalent to one pixel or less, when an image serving as the boundary between the grid line and the background is formed in a dead zone, the coordinates of the grid point cannot be correctly detected. Therefore, the grid line has a multi-step gradation or a continuous gradation in which the lightness varies from the center, thus obtaining a set of data in which positional information of the boundary between the grid line and the background has a gradient across a plurality of pixels. Consequently, the coordinates of the grid point can be correctly detected at a resolution equivalent to one pixel or less.

For the color of the examination screen 2, it is preferable that the background be black and the grid lines and the reference marks 3a and 3b be white. Generally, white is susceptible to illumination and black is hardly affected by illumination. In addition, the imaging device generally has a signal output format in which black represents a zero level. Accordingly, even when there is a difference between the sensitivities of cameras, a black signal level is hardly influenced by the sensitivity, as compared with a white signal level. On the other hand, in a pattern used for matching detection, the area ratio of the background is large. Accordingly, the detection result of the coordinates of the grid point is susceptible to a signal level of the background color.

Figure 4:
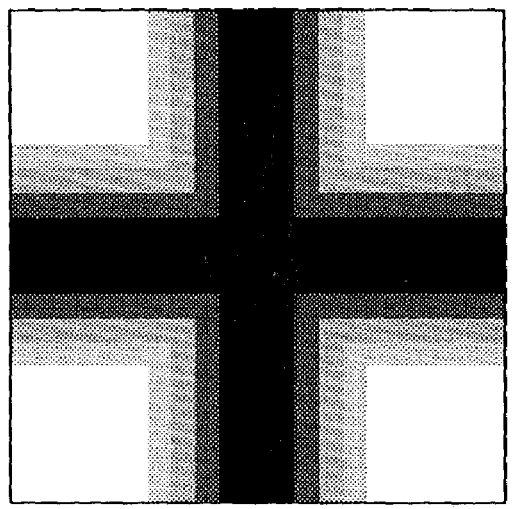
FIG. 4 is an enlarged view of a portion in the vicinity of a grid intersection.
Figure 5:
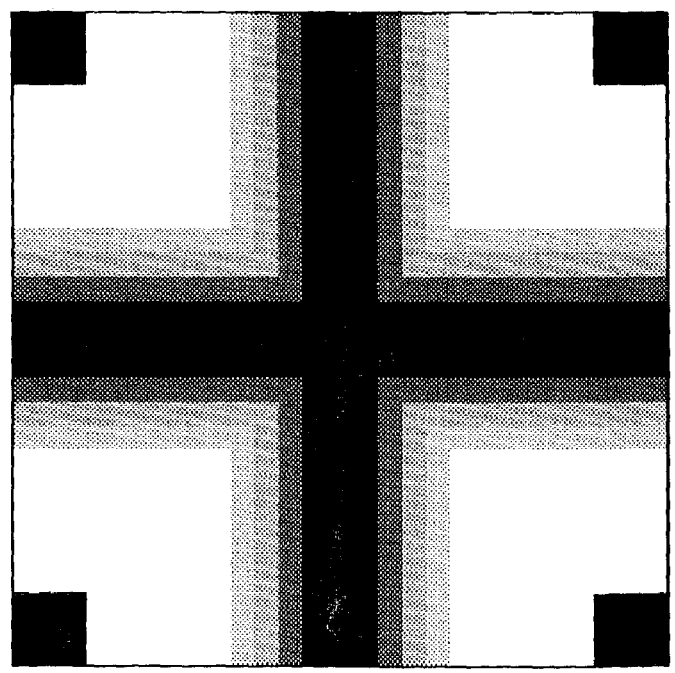
FIG. 5 is an enlarged view of a portion in the vicinity of a reference mark.

Therefore, for the examination screen 2, when the background is set to black and the grid lines and the reference marks 3a and 3b are set to white, more correct grid-point coordinate data can be obtained. Thus, high-accurate correction data can be generated. In this case, in the gradation from the grid line to the background shown in FIGS. 4 and 5, the lightness is set to be lower toward the background and be higher toward the center of the grid line. The reference mark shown in FIG. 5 is also set to white.

Figure 9:
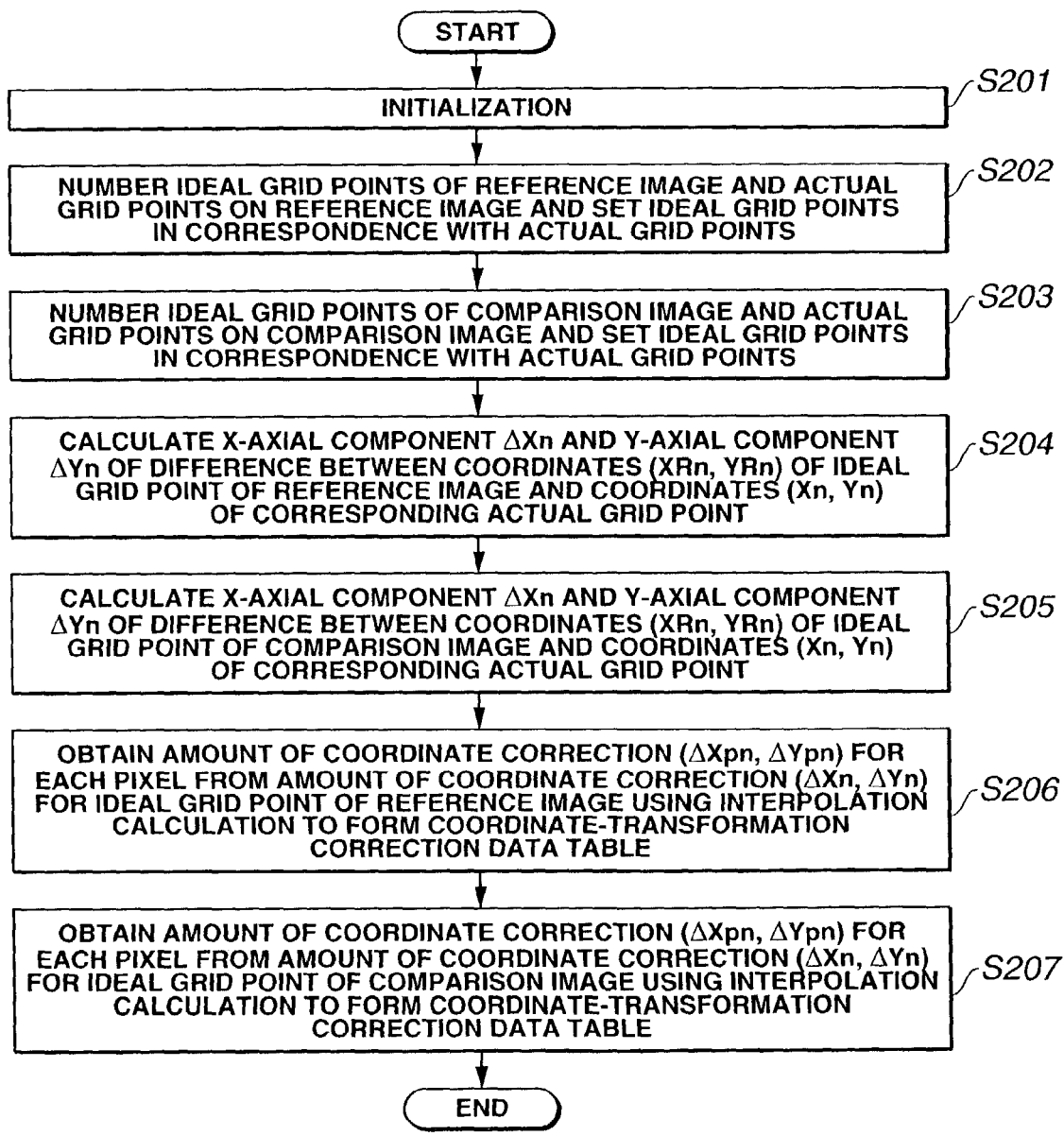
FIG. 9 is a flowchart of a process of calculating image-coordinate-transformation correction data.

A process of calculating the coordinates of each grid point in the stereoscopic image characteristics detection unit 12 will now be described hereinbelow using a flowchart shown in FIG. 6. A process of generating image-coordinate-transformation correction data, a process of generating matching-search start-point correction data, and a process of generating view-angle correction data will be described below using flowcharts of FIGS. 9, 10, and 11, respectively.

Figure 6:
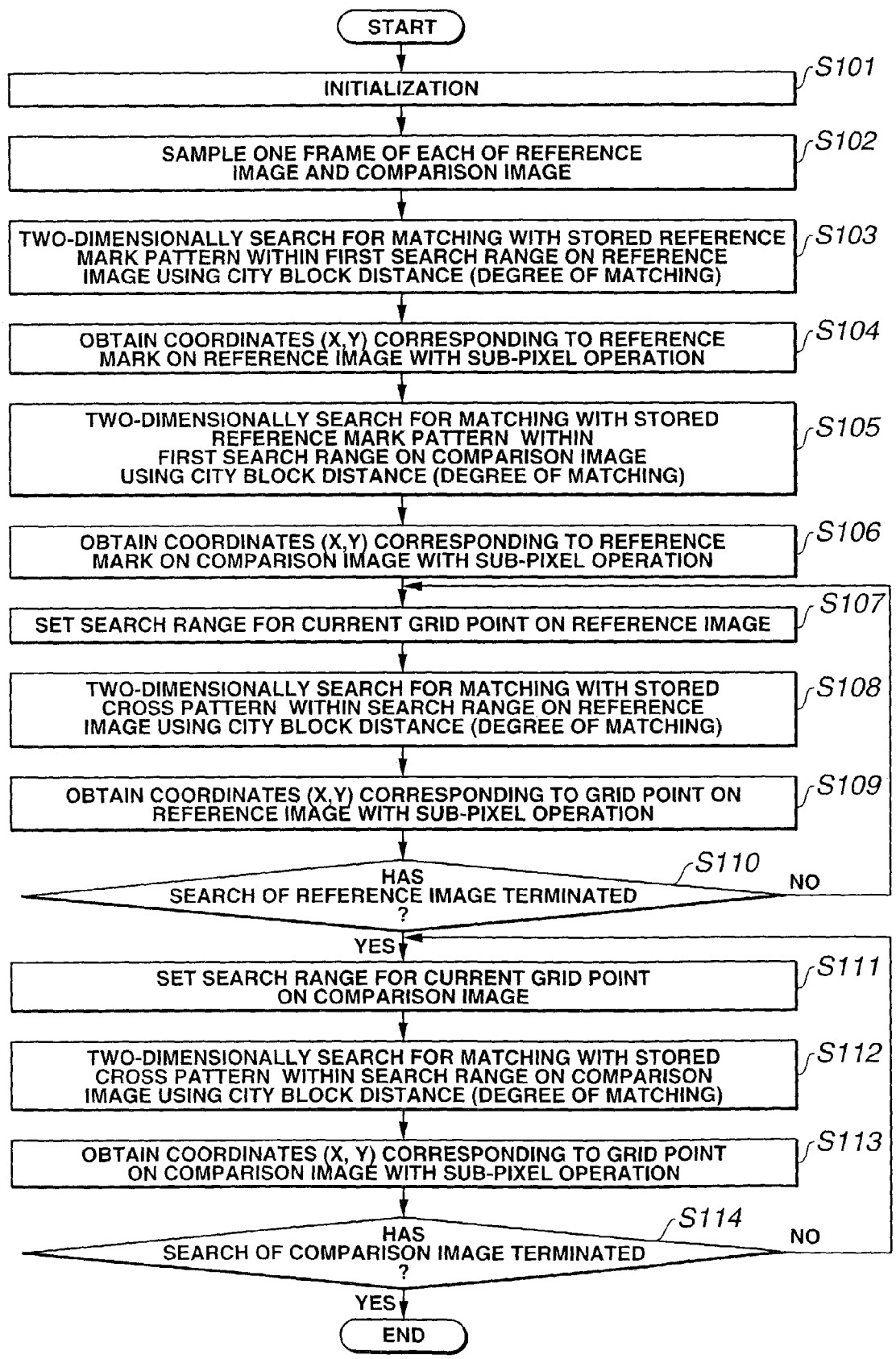
FIG. 6 is a flowchart of a process of calculating the coordinates of each grid point.

In the process by the stereoscopic image characteristics detection, as shown in FIG. 6, in step S101, specification constants of the stereo camera 1 and variables of various processes are initialized. In step S102, one frame of each of the reference image and the comparison image, obtained by photographing the examination screen 2 with the stereo camera 1, is sampled.

Subsequently, the process proceeds to step S103. A first search range on the reference image is set on the basis of the positional relationship between the reference camera 1a and the reference mark 3a on the examination screen 2. Search for matching with the stored reference mark pattern is two-dimensionally performed within the first search range using the city block distance (degree of matching). In step S104, using the horizontal direction as the X-coordinate and the vertical direction as the Y-coordinate, the coordinates (X, Y) of the grid point on the reference image corresponding to the reference mark of the reference image are obtained at a resolution in units equivalent or smaller than one pixel with the sub-pixel operation. For the sub-pixel operation performed in units equivalent to or smaller than one pixel, for example, a method for specifying the position of a minimum value on the basis of the distribution of city block distances and then calculating the coordinates of a minimum point using linear approximation or the like can be used.

Further, in step S105, a first search range on the comparison image is set on the basis of the positional relationship between the comparison camera 1b and the reference mark 3b on the examination screen 2. Search for matching with the stored reference mark pattern is two-dimensionally performed within the first search range on the comparison image using the city block distance (degree of matching). In step S106, the coordinates (X, Y) of the grid point on the comparison image corresponding to the reference mark of the comparison image are obtained with the sub-pixel operation.

Figure 7:
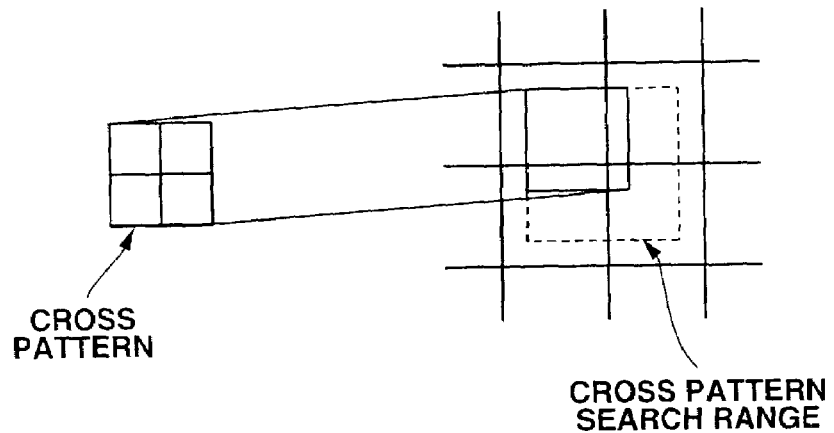
FIG. 7 is an explanatory diagram of matching search between a cross pattern and a grid point.
Figure 8:
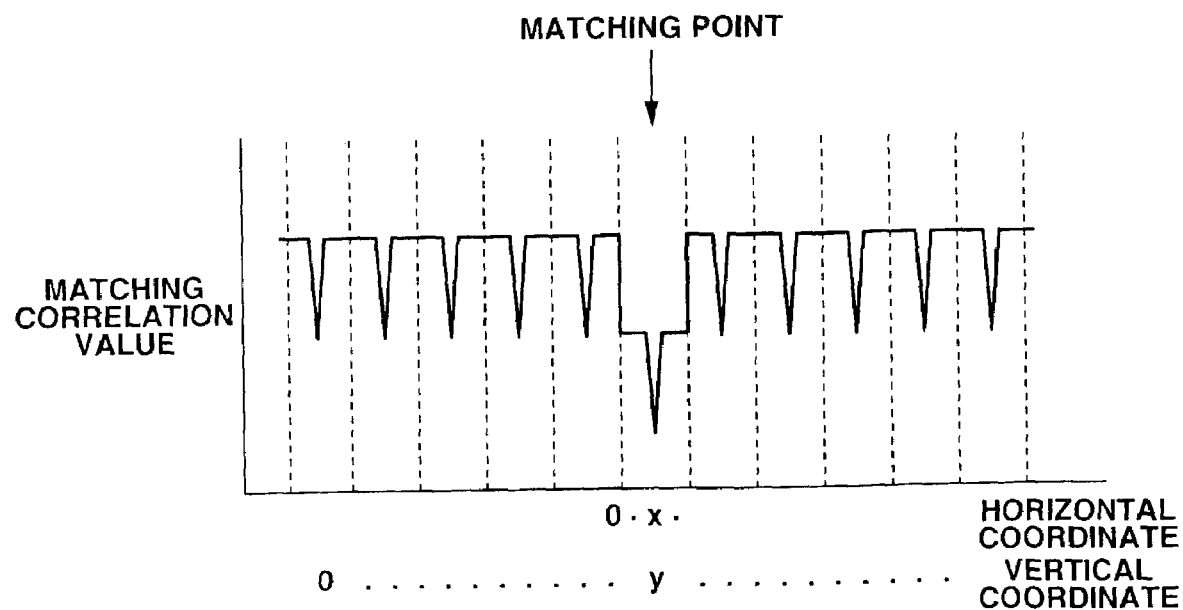
FIG. 8 is an explanatory diagram of the relationship between matching correlation values and a matching point.

Subsequently, the process proceeds to step S107. In order to search a grid point adjacent to the preceding searched grid point on the reference image, a search range for the current grid point is set at a predetermined relative position based on the grid interval obtained from the coordinates of the preceding searched grid point as shown in FIG. 7. In step S108, search for matching with the stored cross pattern 5 is two-dimensionally performed in the set search range on the reference image using the city block distance (degree of matching). FIG. 8 shows matching correlation values (city block distances) of respective scans. A point having the minimum matching correlation value is a matching point.

Subsequently, the process proceeds to step S109. The coordinates (X, Y) corresponding to the grid point on the reference image are obtained with the sub-pixel operation. In step S110, whether the search of the reference image has terminated is determined. If the search is not finished, the process returns to step S107, the search range for the next adjacent grid point is reset, and the above processing steps are executed. If the entire search of the reference image is finished, the coordinates of grid points on the comparison image are obtained in step S111 and subsequent steps.

In step S111, a search range for the current grid point on the comparison image is set. In step S112, search for matching with the stored cross pattern is two-dimensionally performed in the search range on the comparison image using the city block distance (degree of matching). In step S113, the coordinates (X, Y) corresponding to the grid point on the comparison image are obtained with the sub-pixel operation.

In step S114, whether the search of the comparison image has terminated is determined. If the search is not finished, the process returns to step S111, the search range for the next adjacent grid point is set, and the above processing steps are executed. When the entire search of the comparison image is finished, the present process is completed.

According to the above process, the coordinates of all the grid points on the reference image and the comparison image are obtained. Subsequently, in the process of calculating image-coordinate-transformation correction data shown in FIG. 9, coordinate-transformation correction data is generated on the basis of a difference between the coordinates of each grid point and the coordinate of the corresponding ideal grid point stored previously.

In the image-coordinate-transformation correction data calculating process, first, initialization is performed in step S201. In step S202, ideal grid points of the reference image and actual grid points on the reference image are numbered and the ideal grid points of the reference image are set in correspondence with the respective actual grid points on the reference image. In step S203, ideal grid points of the comparison image and actual grid points on the comparison image are numbered and the ideal grid points of the reference image are set in correspondence with the respective actual grid points on the comparison image.

Subsequently, in step S204, a difference between the coordinates (XRn, YRn) of the ideal grid point of the reference image and the coordinates (Xn, Yn) of the corresponding actual grid point on the reference image is set to the amount of coordinate correlation for the ideal grid point of the reference image. The X-axial component $\Delta Xn$ and the Y-axial component $\Delta Yn$ of the coordinate correction amount are calculated. In step S205, similarly, a difference between the coordinates (XRn, YRn) of the ideal grid point of the comparison image and the coordinates (Xn, Yn) of the corresponding actual grid point on the comparison image is set to the amount of coordinate correction for the ideal grid point of the comparison image. The X-axial component $\Delta Xn$ and the Y-axial component $\Delta Yn$ of the coordinate correction amount are calculated.

In step S206, the amount of coordinate correction ($\Delta Xpn$, $\Delta Ypn$) for each pixel is obtained from the amount of coordinate correction ($\Delta Xn$, $\Delta Yn$) for the ideal grid point of the reference image by interpolation calculation, thus forming a coordinate-transformation correction data table. In step S207, the amount of coordinate correction ($\Delta Xpn$, $\Delta Ypn$) for each pixel is obtained from the amount of coordinate correction ($\Delta Xn$, $\Delta Yn$) for the ideal grid point on the comparison image by interpolation calculation, thus forming the coordinate-transformation correction data table. Then, the present process is terminated.

On the basis of the coordinate-transformation correction data table, under actual operating conditions in the market where the stereo camera 1 and the stereoscopic image recognition unit 11 are combined with each other in a one-to-one relationship, lateral and longitudinal deviations and rotational deviations between the reference image and the comparison image, distortions of lenses, a variation in focal lengths are corrected. Thus, a correct parallax can be detected.

Figure 10:
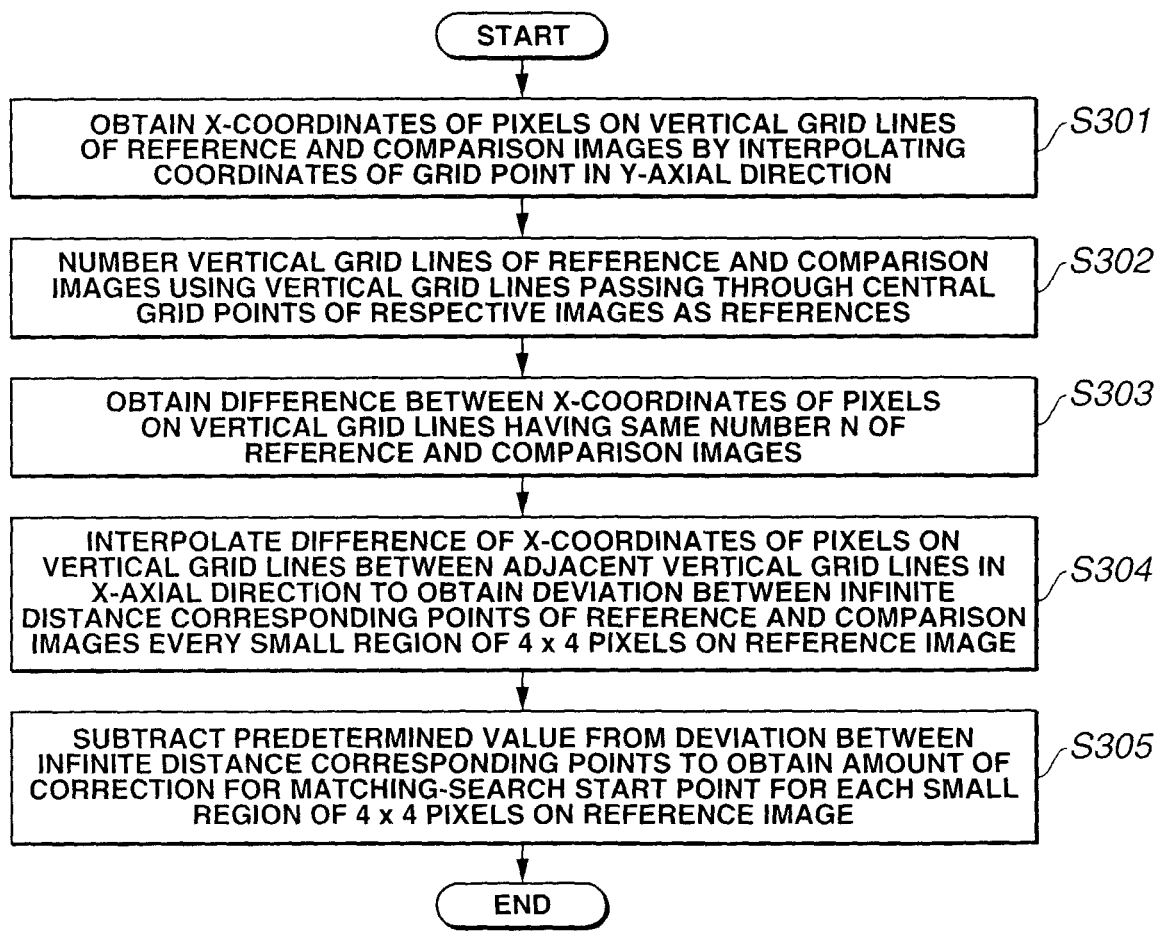
FIG. 10 is a flowchart of a process of calculating matching-search start-point correction data.

The process of calculating matching-search start-point correction data will now be described with reference to FIG. 10. In the present process, in step S301, the X-coordinates of pixels on the vertical grid lines of the reference and comparison images are obtained by interpolating the coordinates of the grid point in the Y-axial direction. Subsequently, in step S302, the vertical grid lines of the reference and comparison images are numbered using the vertical grid lines passing through the respective central grid points of the reference and comparison images as references.

Subsequently, the process proceeds to step S303. A difference between the X-coordinates of pixels on the vertical grid lines having the same number N of the reference and comparison images, namely, a deviation between infinite distance corresponding points is calculated. In step S304, the difference between the X-coordinates of the pixels on the vertical grid lines is interpolated between the adjacent vertical grid lines in the X-axial direction to obtain the deviation between the infinite distance corresponding points of the reference and comparison images every small region (for example, small region of 4×4 pixels) on the reference image. In step S305, a predetermined value is subtracted from the deviation between the infinite distance corresponding points to obtain the amount of correction for matching-search start point for each small region on the reference image. Thus, the process is completed.

Under actual operating conditions in the market where the stereo camera 1 is combined with the stereoscopic image recognition unit 11 in a one-to-one relationship, using the amount of matching-search start-point correction, the start point for matching search can be appropriately set in accordance with a deviation between the infinite distance corresponding points. Consequently, loads on the operations can be held down during the stereo matching process and mismatching is prevented, resulting in the improvement of reliability.

FIG. 11 shows a flowchart of the process of calculating view-angle correction data. In step S401, the X-coordinates of pixels on the vertical grid lines of the reference and comparison images are obtained by interpolating the coordinates of a grid point in the Y-axial direction. In step S402, the vertical grid lines of the reference and comparison images are numbered using the vertical grid lines passing through the central grid points of the respective images as references.

Subsequently, the process proceeds to step S403. A difference (grid interval) D between the X-coordinates of pixels having the same Y-coordinate on the adjacent vertical grid lines of the comparison image is obtained as a minute actual view angle every pixel on each vertical grid line of the comparison image. In step S404, the view-angle correction ratio R is calculated every pixel on each vertical grid line of the comparison image, using the grid interval D indicating the actual view angle and a predetermined ideal grid interval M (R=D/M).

After that, the process proceeds to step S405. The view-angle correction ratio R is integrated from the left end (initial value position) of the comparison image in the horizontal scanning direction to obtain a view-angle correction-ratio integrated value S every pixel on each vertical grid line of the comparison image. In step S406, the view-angle correction-ratio integrated value S of each pixel on each vertical grid line is interpolated between the adjacent vertical grid lines in the X-axial direction to form a view-angle correction-ratio integrated-value table for the X-coordinates on the comparison image every processing scan line (for example, four scan lines).

In other words, parallax data obtained by matching-point search in the stereoscopic image corresponds to a value obtained by integrating a difference between minute view angles each for one pixel in the parallax detection scanning direction. Accordingly, the view-angle correction-ratio integrated value S, which is obtained by integrating the view-angle correction ratio R every pixel of the comparison image from the-image-coordinate initial position, is set to correction data including a difference between lens focal lengths, the influences of lens distortions, and a difference in the shooting directions. Parallax data obtained in matching search by the stereoscopic image recognition unit 11 in the actual operating state in the market can be directly corrected using the correction data.

Subsequently, in step S407, a difference (deviation between the infinite distance corresponding points) between the X-coordinates of pixels on the vertical grid lines having the same number N of the reference and comparison images is obtained. In step S408, a difference between the X-coordinates of pixels on the vertical grid lines is interpolated between the adjacent vertical grid lines in the X-axial direction to form a table of deviations between the infinite distance corresponding points of the reference and comparison images every small region (for example, 4×4 pixels) in the reference image.

In step S409, the deviation between the infinite distance corresponding points of the reference and comparison images is added to the X-coordinate of the small region in the reference image to obtain the X-coordinate of the infinite distance corresponding point in the comparison image corresponding to the small region of 4×4 pixels in the reference image. In step S410, with reference to the view-angle correction-ratio integrated-value table on the basis of the X-coordinate of the infinite distance corresponding point in the comparison image, an infinite-distance-corresponding-point view-angle correction-ratio integrated-value table is formed every small region of 4×4 pixels in the reference image. Then, the present process is completed.

In the actual operating state in which the stereo camera 1 is combined with the stereoscopic image recognition unit 11 in a one-to-one relationship, the influences of a difference between lens focal lengths, lens distortions, and a difference in the shooting directions can be corrected with respect to the search matching point and the infinite distance corresponding point on the comparison image by referring to the view-angle correction-ratio integrated-value table and the infinite-distance-corresponding-point view-angle correction-ratio integrated-value table.

As mentioned above, according to the present embodiment, prior to shipment or upon readjustment after shipment, the general characteristics of the stereo camera 1 and those of the stereoscopic image recognition unit 11, which is combined with the stereo camera 1, can be examined in a simple system construction with high accuracy, and comprehensive and high-accurate correction data can be obtained.

Consequently, it is possible to permit a correcting mechanism, provided for each of various apparatuses each using a stereo camera in the market, to effectively function. Thus, the accuracy of distance information and the reliability thereof can be increased. Furthermore, according to the present examination system, various correction data can be calculated by photographing once. Accordingly, automation can be easily realized and adjustment can be performed more rapidly than mechanical adjustment, resulting in a reduction of cost of the apparatus.

As described above, according to the stereoscopic image characteristics examination system of the present invention, prior to shipment of an apparatus having a stereo camera or upon readjustment after shipment, the stereoscopic image characteristics are accurately examined in a simple system construction and comprehensive and high-accurate correction data can be obtained. When using the present system, correcting mechanisms of various apparatuses each having a stereo camera in the market can be allowed to effectively function, resulting in an increase of the recognition accuracy based on correct distance information and the improvement of reliability.

Obviously many widely different embodiments of the present invention may be made without departing from the spirit and scope thereof. It is to be understood that the invention is not limited to the specific embodiments thereof except as defined in the appended claims.

What is claimed is:

1. A stereoscopic image characteristics examination system for examining the characteristics of a stereoscopic image captured by a stereo camera having a plurality of cameras and for generating correction data, the system comprising:

an examination screen having a grid pattern including a plurality of grid lines and a background, each of a plurality of intersections of the grid lines defining a grid point, and said screen arranged in a shooting direction of the stereo camera; and means for obtaining the coordinates of each grid point on each of a pair of images constituting a stereoscopic image obtained by photographing the examination screen with the stereo camera, the images corresponding to the respective cameras constituting the stereo camera, and for generating correction data for correcting a variation in the characteristics of the stereoscopic image in order to detect a correct parallax, the correction data being generated on the basis of the obtained coordinates and the corresponding ideal coordinates previously stored of each grid point, the variation being caused by at least the characteristics of the stereo camera.

2. The system according to claim 1, wherein a correlation value between an image pattern on the examination screen and a previously stored pattern is calculated to search for a matching point so as to obtain the coordinate of each grid point on each image.

3. The system according to claim 1, wherein a reference mark corresponding to each camera is provided on the examination screen, the reference mark is initially searched, and adjacent grid points are sequentially detected to obtain the coordinates of the grid points on each image.

4. The system according to claim 1, wherein each grid line on the examination screen is formed so as to have a gradation, of which lightness varies in at least one of a multi-step manner and continuously from the center of the grid line to the background.

5. The system according to claim 1, wherein in the examination screen, the lightness of the grid line is higher than that of the background.

6. The system according to claim 1, wherein the correction data is at least one of image-coordinate-transformation correction data, parallax correction data based on the view-angle correction ratio, and matching-point search-range correction data.

7. The system according to claim 1, further comprising:
means for capturing the stereoscopic image from the stereo camera through a stereoscopic image recognition unit, which is combined with the stereo camera in a one-to-one relationship and for writing the correction data in a non-volatile memory in stereoscopic image recognition unit.

8. A stereoscopic image characteristics examination system for examining the characteristics of a stereoscopic image and for generating correction data, the system comprising:
a stereo camera having a plurality of cameras for obtaining each of a pair of images constituting the stereoscopic image of an examination screen having a grid pattern including a plurality of grid lines and a background, each of a plurality of intersections of the grid lines defining a grid point, and said examination screen provided in a shooting direction of the stereo camera;
a stereoscopic image recognition unit, said stereoscopic image recognition unit and said stereo camera being provided in combination for obtaining a parallax and processing three-dimensional distance distribution information based on the obtained parallax for the stereoscopic image;
means for obtaining the coordinates of each grid point on each of said pair of images; and
means for generating correction data for correcting a variation in the characteristics of the stereoscopic image in order to detect a correct parallax, the correction data being generated on the basis of the obtained coordinates and the corresponding ideal coordinates previously stored of each grid point, the variation being caused by the characteristics of at least one of said said stereo camera and said stereoscopic recognition unit.

* * * * *